H. N. WHITTELSEY.
VAPORIZING PROCESS.
APPLICATION FILED JULY 28, 1914.

1,183,939.

Patented May 23, 1916.
4 SHEETS—SHEET 1.

WITNESSES:

INVENTOR
Henry Newton Whittelsey
BY
Herbert G. Ogden
his ATTORNEY

H. N. WHITTELSEY.
VAPORIZING PROCESS.
APPLICATION FILED JULY 28, 1914.

1,183,939.

Patented May 23, 1916.
4 SHEETS—SHEET 2.

H. N. WHITTELSEY.
VAPORIZING PROCESS.
APPLICATION FILED JULY 28, 1914.

1,183,939.

Patented May 23, 1916.
4 SHEETS—SHEET 3.

WITNESSES:

INVENTOR
Henry Newton Whittelsey
BY
Herbert G. Ogden
his ATTORNEY

H. N. WHITTELSEY.
VAPORIZING PROCESS.
APPLICATION FILED JULY 28, 1914.

1,183,939.

Patented May 23, 1916.
4 SHEETS—SHEET 4.

WITNESSES:
A. E. Parham
M. M. Riemann

INVENTOR
Henry Newton Whittelsey
BY
Herbert G. Ogden
his ATTORNEY

UNITED STATES PATENT OFFICE.

HENRY NEWTON WHITTELSEY, OF GREENWICH, CONNECTICUT, ASSIGNOR TO WHITTELSEY COMPANY, OF NEW YORK, N. Y., A CORPORATION OF NEW YORK.

VAPORIZING PROCESS.

1,183,939.   Specification of Letters Patent.   Patented May 23, 1916.

Original application filed March 29, 1913, Serial No. 757,501. Divided and this application filed July 28, 1914. Serial No. 853,773.

*To all whom it may concern:*

Be it known that I, HENRY NEWTON WHITTELSEY, a citizen of the United States, residing at Greenwich, in the county of Fairfield and State of Connecticut, have invented certain new and useful Vaporizing Processes, of which the following is a specification.

My invention relates to vaporizers and carbureters primarily for use in connection with internal-combustion engines in which I use certain constituent members, power-driven in connection with the use of liquid fuels, particularly those liquid fuels difficult to vaporize properly at ordinary atmospheric temperatures.

The objects of my invention, among other things, are to form a good gaseous mixture for introduction into an internal-combustion engine, consisting of a gas from the liquid fuel supplied together with a proper quantity of air requisite for complete combustion, both the fuel gas and the air being intimately mixed together; to form a rich gaseous mixture by admitting the liquid fuel and only a small relatively quantity of air, whatever additional air requisite for complete combustion being supplied in any suitable manner before combustion takes place in the engine; to form a hydro-carbon gas by admitting the liquid fuel but no air to my device; and, to control at will the quantity of the supply of air and fuel to my device, and the quantity of the product to be delivered from my device. I attain these objects by mechanism illustrated in the accompanying drawings, in which—

Similar letters and numerals refer to similar parts throughout the several figures.

Figure 1:
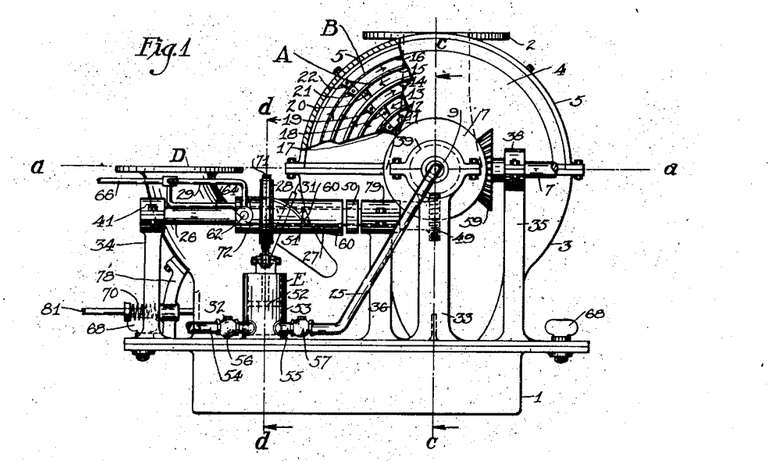
Figure 1 is a side elevation view with part of the rotor-casing removed showing portions of the rotor screens and fan blades in section taken on the line *b—b* of Fig. 2.
Figure 2:
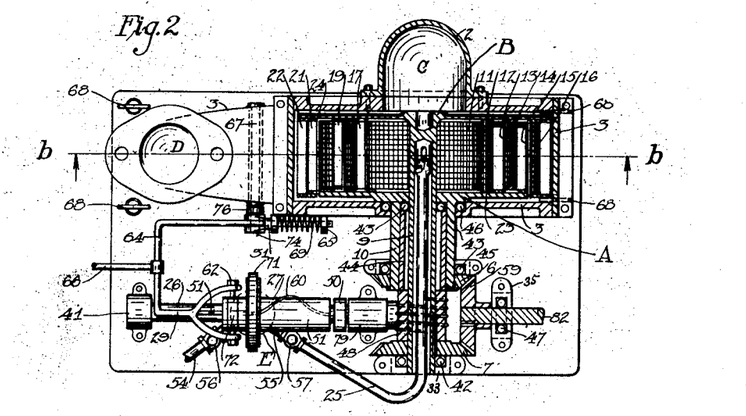
Fig. 2 is a top plan view of my device with certain parts in section on the line *a—a* of Fig. 1.
Figures 4, 5:
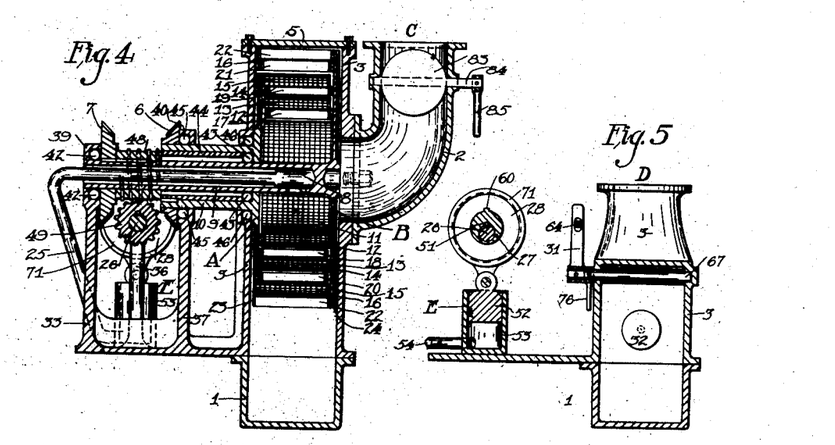
Fig. 4 is a vertical sectional view through the line *c—c* in Fig. 1 looking in the direction of the arrow.
Fig. 5 is a cross sectional view through the line *d—d* in Fig. 1 looking in the direction of the arrow.

Referring to Figs. 1 and 2, which show generally the preferred embodiment of my invention, 1 designates the removable pan attached by thumb screws 68 to the casing member 3, which pan is devised to catch waste matter from my device and forms the bottom member of my rotor casing. The other parts of rotor casing are made up of several casing members 3, 4 and 5, suitably formed and joined together by bolts and nuts as shown. The casing member 3 has a wide flange which carries the supports 33, 34, 35, 36 and 37. This rotor casing affords the inclosure and support for the two rotor members A and B respectively, which will be hereinafter described in detail. C is the air intake passage formed by the member 2 and D is the outlet passage formed in the member 3. An electric motor 73 (Fig. 26) or any other form of power including the engine to which my device may be attached actuates the power shaft 82 carried by the support 35 having the ball bearings 47 covered by the cap 38. Secured to the inner end of the shaft 82 is the gear 59 which enmeshes at right angles with the gears 6 and 7 thereby rotating said gears in opposite directions. Rigidly attached to the gear 7 is the hollow shaft 9 having its outer end carried by the support 33 having the ball bearings 42, such ball bearings 42 being covered by the cap 39. The inner portion of the shaft 9 is carried by the ball bearings 43 held in the shaft 10. The ball bearings 43 are held in place by a suitable distance tube 44 shown in Figs. 2 and 4. In like manner the gear 6 is rigidly attached to the hollow shaft 10, of greater diameter than the shaft 9, which revolves within the shaft 10 as shown in Fig. 2. The outer part of the shaft 10 is carried by the ball bearings 45 held in the support 37, covered by the cap 40, and its inner part is carried by the ball bearings 46 held in suitable grooves in the casing members 3 and 4 as shown in Fig. 4. Other forms of bearings may be used, but I prefer the use of ball bearings in order to decrease friction.

Figures 6, 7:
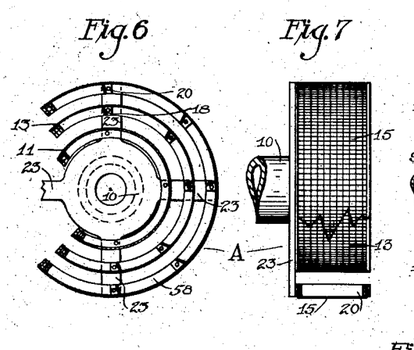
Fig. 6 is a longitudinal vertical section view of the rotor A.
Fig. 7 is an end view of the same rotor.
Figure 8:
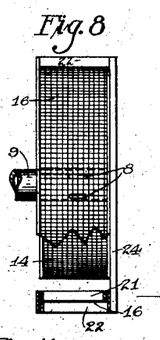
Fig. 9 is a similar longitudinal vertical section view of the rotor B and Fig. 8 is an end view of the same rotor.
Figure 9:
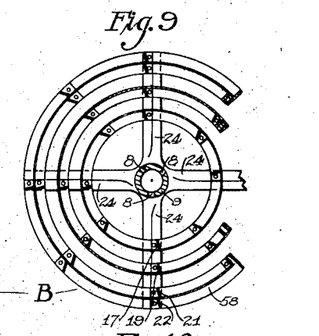
Figures 10, 11, 12, 13, 14, 15, 16, 17:
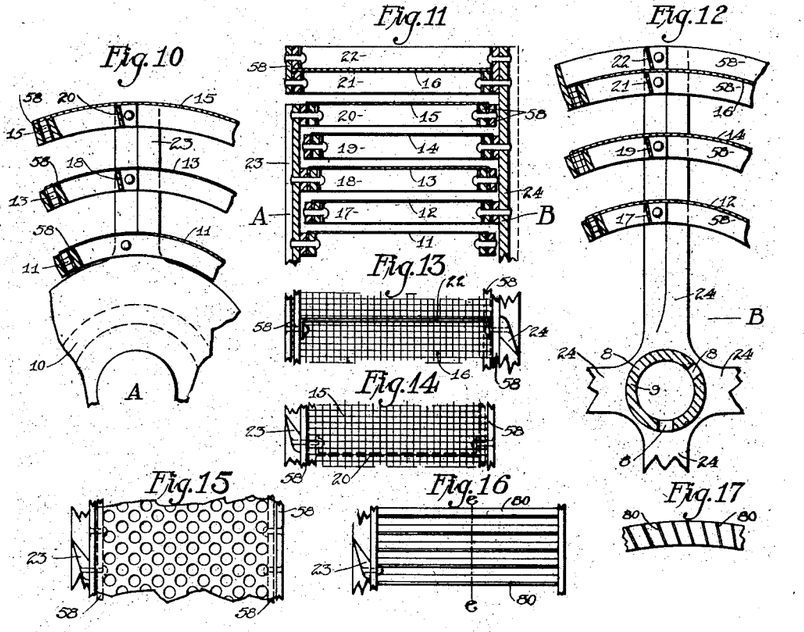
Fig. 10 is an enlarged side view of Fig. 6, in part, showing certain fan blades and screens.
Fig. 11 is a cross-sectional view of the upper part of the rotors A and B showing the structure of the fan blades and screens in detail.
Fig. 12 is an enlarged side view of Fig. 8, in part, showing certain fan blades and screens.
Fig. 13 is a view showing a portion of the outer screen of the rotor B.
Fig. 14 is a view similar to Fig. 13, showing the same structure in the rotor A.
Fig. 15 is a plan view showing the use of perforated sheets instead of screens in the rotors.
Fig. 16 illustrates the use of transverse blades instead of screens in the rotors.
Fig. 17 is a cross-sectional view taken on the line *e—e* of Fig. 16.

The two rotor members A and B will now be described. The rotor A has a plurality of arms 23 integral with the hollow shaft 10 and have preferably a blade shape, as shown in Fig. 14, so as to draw the products within my device away from the side surfaces of the rotor casing. To these arms 23 are attached circular rings 58 in turn securing a series of concentric circular screens 11, 13, and 15, extending outwardly at substantially right angles from the arms 23 as shown in Figs. 2, 4 and 7; 18 and 20 are fan blades attached to the rotor A arranged at an angle to the radial planes passing through the center line of the rotor shaft 10. The rotor B is constructed similarly to the rotor A, having a plurality of arms 24 integral with the shaft 9 as shown in Fig. 9. These arms 24 are preferably blade-shaped as well, as shown in Fig. 13, so as to assist in drawing in air through the passage C and also to draw the products in the device away from the side of the rotor casing. To these arms 24 are attached circular rings 58 in turn securing a series of concentric circular screens 12, 14 and 16 extending outwardly at substantially right angles from the arms as shown in Figs. 2, 4 and 9. The screens 11, 13, 15 of the rotor A and the screens 12, 14 and 16 of the rotor B are built so as to alternately telescope within each other as shown in Figs. 1 to 4 inclusive. 17, 19, 21 and 22 are the fan blades attached to the rotor B, also arranged at an angle to the radial planes passing through the center line of the rotor shaft 9. The rotors A and B revolve in opposite directions through the gearing 6, 7 and 59 heretofore described. The angularity of the fan blades is adjusted to assist in drawing air into the device through the passage C and afterward delivering the desired volume of the mixture through the outlet D of the particular internal-combustion engine to which the device may be fitted.

Referring to Fig. 1 showing the rotor screens and the fan blades in cross section, I have indicated by arrows the direction of rotation of the respective screens and have also shown the positions of the respective fan blades; it will be noted that the blades 17 are located within the screen 12, the blades 17 being attached to the rotor B and the screen 12 being a part of the rotor B. This system of locating the blades within the attending screens is maintained throughout the rotors, excepting the blades 22 which are located outside of the screen 16. These blades, however, may be placed outside the screens which would slightly alter the construction. Perforated sheets may be used instead of screens, as shown in Fig. 15, which are secured to the circular rings 58 in turn secured to the arms 23; also, the use of screens may be dispensed with and transverse blades 80, shown in Figs. 16 and 17 may be utilized with substantially the same function and effect.

In my preferred embodiment liquid fuel is supplied through the pipe 25 in the hollow shaft 9 of the rotor B to the slots 8 located about the centers of the two rotors A and B, such fuel being forced through the pipe 25 connected with the fuel pump E. The pump E is of the ordinary plunger type actuating a piston 52 in the cylinder 53. The intake and discharge are through the piping 54 and 55 respectively, in which are arranged check valves 56 and 57 respectively. The piping 54 can be directly connected with the fuel tank provided the level of the tank is below the level of the pump; if the level is above the pump or if the fuel tank is under pressure a float valve chamber may be utilized. The pump E is operated by the shaft 26 through the eccentrics 27 and 28 held within the circular strap 71. The eccentric 27 is held on the shaft 26 by the key 51. The shaft 9 of the rotor B has keyed to it the sleeve 48 carrying a worm thread, as shown in Fig. 4, which actuates the gear 49 keyed to the pump shaft 26 held by the supports 34 and 36, the bearings having the caps 41 and 79 respectively. The shaft 26 also has the collar 50 pinned to it and the eccentric 27 is of considerable length and is shown extending from the left-hand side of the eccentric 28 to the collar 50, and may be moved on the shaft 26 to the left as far as the bearing 41. An eccentric worm thread 60 on the eccentric 27 is shown in Figs. 1, 2, 5, 18 to 22 inclusive; as the eccentric 27 moves laterally within the eccentric 28 the latter takes the worm thread 60, and is rotated on the eccentric 27 through means of such worm thread 60. The split collar 72 is secured about the left end of the eccentric 27 and the bolt 62 secures this collar to the forked end of the rod 29, as shown in Fig. 2. Figs. 18 to 22 inclusive show five stages of position between that originally shown in Figs. 1, 2 and 5 and the final position shown in Fig. 22.

Figure 18:
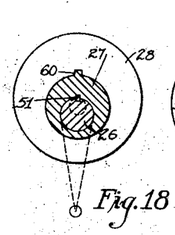
Figs. 18, 19, 20, 21 and 22 illustrate various positions of the eccentrics in connection with the fuel pump.
Figure 19:
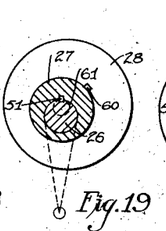
Figure 20:
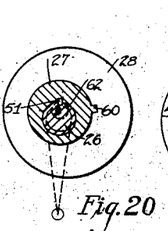
Figures 21, 22:
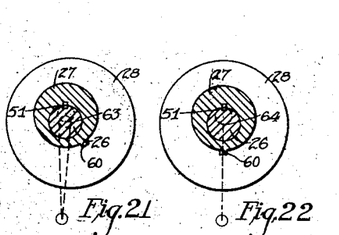

Referring to Figs. 18 to 22 and particularly to Fig. 19, I show the new position of the eccentric 28 with its center located at 61, the movement of the eccentric 27 being one-quarter of its possible travel, also the relative crank circle of the pump. In Fig. 20 I show the new position of the eccentric 28 when the eccentric 27 has moved through one-half of its travel; also the new center 62 of the eccentric 28 and the relative crank circle of the pump. So likewise in Fig. 21 I show further movements of the eccentric 27 with 63 as the center, and the relative crank circle of the pump; and in Fig. 22 I show the extreme movement of the eccentric 27 in which the center 64 of the eccentric 28 coincides with the center of the pump shaft 26. Since the pump E is operated from the eccentric 28 through the strap 71, it is evident that I may vary, at will, the stroke of the pump from the maximum as shown in Fig. 18 to zero as shown in Fig. 22 through the controlling rod 29, thereby obtaining complete control of the fuel supplied to my device; nevertheless fuel may be supplied to the rotors of my device by any of the well-known means suitable for this purpose.

To control the volume of gaseous mixture passing through the outlet passage D, I employ the valve 30 (Fig. 3) controlled by the lever 31 (Fig. 5). The valve 30 is of the ordinary flat type, hinged at one end on the pivoted rod 67, so that the opening of such valve will cause as little wire drawing as possible. When the valve 30 is opened as far as possible, the internal combustion engine, to which my device may be fitted, would take the full volume of gaseous mixture delivered by the rotors. The delivery speed of the gaseous mixture from the rotors is such as to promptly supply the engine, without putting more pressure on the intake gas than the motor engine is designed to handle properly. Since the rotors in my device may be constructed without fan blades, the flow of the gaseous mixture may be produced entirely by the suction of the engine. As the valve 30 closes it retards the quantity of the outgoing gaseous mixture, thereby raising the pressure above that of the atmosphere on the rotor side of the valve, which in turn retards the in-flow of air through the passage C. I, therefore, by this means provide an automatic control of the inflowing air.

Figure 25:
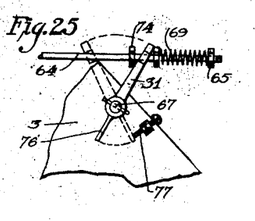
Fig. 25 is a detail view of the valve stop in the outlet passage of my device.
Figures 26, 27:
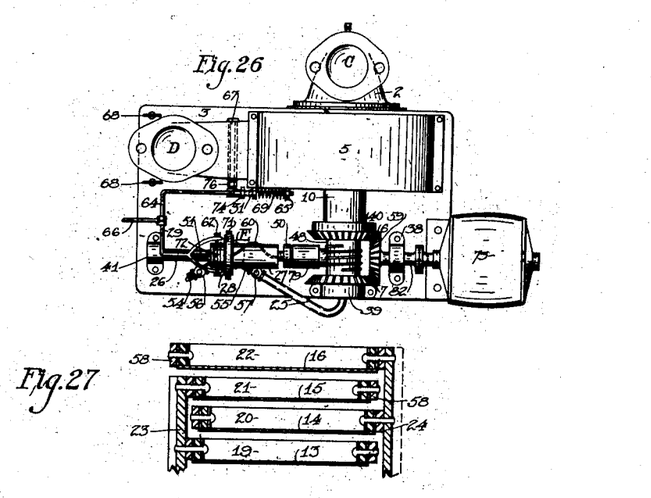
Fig. 26 is a top plan view of my device showing the control of the outlet valve and fuel supply as well as the electric motor connected with my device.
Fig. 27 is a view showing a modified form of the positions of the fan blades in relation to the screens.

Referring to Fig. 26, I show the simultaneous control of the outlet valve 30 and the fuel pump E. The control rod 29 regulates the position of the eccentric 27 as heretofore described. The valve lever 31 has an elongated hole at the upper end thereof, through which the rod 64 passes. A coil spring 69 surrounds the rod 64 and normally holds the lever 31 against the nut 74 the spring being retained in place by the nut 65. The rods 29 and 64 are connected together with the single control rod 66, as shown in Figs. 2 and 26. The relative lengths of the rods 29 and 64 are such that the fuel supply will be proper for the volume of gaseous mixture flowing through the valve 30, from maximum to minimum power of the internal combustion engine to which the device may be fitted. When the volume of gaseous mixture and fuel is reduced, by the movement of the control rod 66 to the point of minimum power of the engine, I prefer to stop the outlet valve 30 at this point. This stopping is accomplished by means of the small lever 76 secured to the pivoted rod 67 and stopped by the regulating screw 77, as shown in Fig. 25. In the further outward lateral movement of the rod 66, the eccentric 27 will be further moved to the extent of closing the fuel supply entirely. During this operation the lever 31 remains stationary since the valve 30 has passed through its predetermined movement and the rod 64 will slide through the lever 31 against the resistance of the coil spring 69, thereby providing means for further entirely closing the fuel supply and regulating the outlet valve to permit the passage of air. This control is effected without interfering in any way with the normal combined control of the gaseous mixture and the air at low power and at all points above the low power of the engine.

Referring to Figs. 10 to 16 inclusive, I indicate in these views how the rotor screens may be held by the circular rings 58, two on each side of each rotor screen, as shown in Fig. 11. The rings 58 are secured to the rotor arms 23 and 24 respectively, and the fan blades 17 to 22 inclusive are likewise secured to the rings 58 as shown in these figures.

Figure 23:
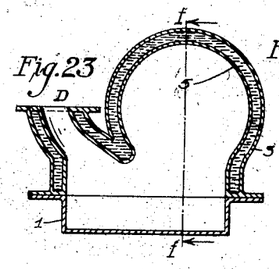
Fig. 23 is a side elevation view of the casing with circulating water or exhaust gas jacketed and Fig. 24 is a cross sectional view of the casing shown in Fig. 23, taken on the line *f—f*, looking in the direction of the arrow.
Figure 24:
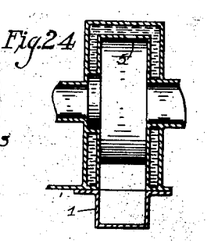

Figs. 23 and 24 show the jacketings of the casings which provide a space for water or exhaust gas to circulate from the engine and such jacketings may be arranged to provide additional heat from exterior sources as may be desired.

I provide the removable pan 1, to receive all waste matter that will not vaporize in the rotors, which pan is shown to be attached to the bottom of the casing member 3 by the thumb screws 68. The shape of the casing as shown in Fig. 3 is such that all waste matter would be caught along the left side wall of this pan 1, and would not be carried on with the gaseous mixture through the outlet passage D.

Figure 3:
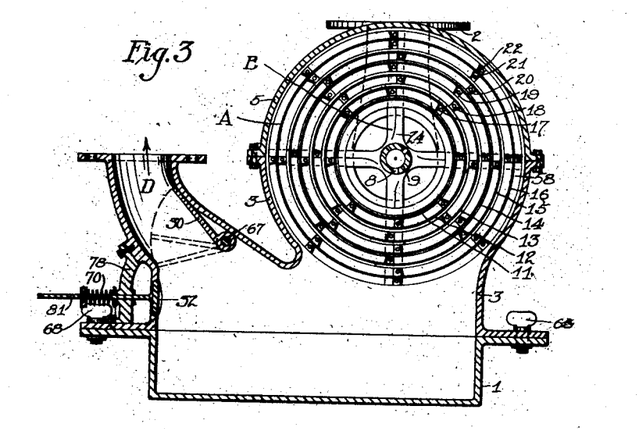
Fig. 3 is a longitudinal section view in elevation taken on the line *b—b* in Fig. 2 looking in the direction of the arrow.

Referring to Fig. 3 I show a valve 32 located in the left end wall of the casing member 3 mounted in the bracket 78 and controlled, at will, by the stem 81, which valve 32 is held in position by the coil spring 70. The purpose of this valve is to permit an opening for air to escape, when the rotors are running without fuel being supplied, and the engine to which the device is attached is at rest.

Referring to Fig. 4 I show the ordinary butterfly valve 83 pinned to the pivoted rod 84 which has secured to it the lever 85, whereby the valve 83 may be controlled to regulate the intake air when desired.

Referring to Fig. 27, I show a modified form of the location of the fan blades when such blades are outside instead of inside their respective screens. The sides of the screens are turned outwardly and are secured between the rings 58 as shown. By reference to Fig. 11 it will be noted that the fan blades 21 are attached to the rotor B on the arm 24, but in the modified arrangement shown in Fig. 27 the fan blades 21 are attached to the rotor A on the arm 23; therefore in this modified arrangement the fan blades that were attached to the rotor A have been attached to the rotor B, and vice versa, except that the blade 22 always remains attached to the rotor B.

The operation of my device is as follows: The two rotor members are caused to revolve at high speed in opposite directions by the gears 6, 7, and 59 driven from the shaft 82. The liquid fuel is introduced through the pipe 25 in the hollow-shaft 9 of the rotor B and is fed to the rotors through the slots 8. Air is admitted into the device through the intake passage C. While the rotors are running at the requisite high speed for the character of the fuel used, the fuel is distributed on the inside circular screen 11 of the rotor A running in the opposite direction to the fuel slots 8. Due to the high rotative speed of the screen 11 of rotor A, centrifugal force causes the liquid fuel to pass through and leave the same outwardly, the liquid fuel having been divided into globules by the screen 11 and having a high velocity imparted to it, while passing through this screen. These globules, having such high velocity, travel in a tangential direction, and impinge on the screen 12 of rotor B, with an impact of very high velocity, due to the velocity of the globules and the high rotative speed of the screen 12, the direction of the former being substantially counter to the direction of the latter. This impact causes a material change of form of the liquid fuel globules, which results in generating a material quantity of heat instantaneously taken up by the liquid fuel in raising certain parts of the globules to the temperature of vaporization and in supplying to such parts the latent heat of the vaporization, and thus vaporizes these parts. A single globule may impinge successively on a number of screen wires owing to the angle at the point of impact between the path of travel of the globule and the path of the screen, and also to the high rotative speed of the screen.

The greatest heat is generated in those parts of the globules most directly acted upon by the screen wires or resistant surfaces, and because liquids are poor conductors of heat, this heat generated is therefore instantaneously applied to those certain parts, and they may be vaporized, without raising the temperature of the globules as a whole to the temperature of vaporization.

I have now described a cycle in a process of vaporizing of liquid fuel, which results in vaporizing parts of the globules and leaving a greater part of the remainder for an instant on the screen 12 of rotor B, those parts that may have been thrown off, are carried onto screen 12 or screen 13 by the general movement of the gas and air due to the fan blade action or the suction of the internal combustion engine to which the device may be fitted.

In the second vaporization cycle the liquid fuel leaves screen 12 of rotor B, impinges on screen 13 of rotor A traveling at high rotative speed in counter direction to that of screen 12; the impact being of very high velocity, resulting in further vaporization of parts of the globules of the liquid fuel and leaving for an instant the greater part of the remainder of the globules on the screen 13, the action being the same as before described in the first cycle. Another vaporization cycle takes place in the same manner from screen 13 of rotor A to screen 14 of rotor B, another from screen 14 to screen 15 of rotor A, and still another from screen 15 to screen 16 of rotor B, and the liquid fuel is finally and completely vaporized before the end of the last cycle.

Referring to the fan blades 18 and 20 of rotor A, and 17, 19, 21, and 22 of rotor B, the arrows in Fig. 1 indicate the rotative direction of the various screens, and the direction of the blades is the same as the direction of the screens within which they are located, excepting blades 22 which are outside of screen 16 and travel in the same direction as this screen. Air having been brought into the center of the device as before described, it is drawn through screen 11 of rotor A and enters the circular space between screen 11 and screen 12, the latter being of rotor B. In this space the blades 17 attached to rotor B, traveling in the same direction as screen 12, drive to a certain extent the air and gaseous mixture around the circular space between these screens before they have passed through screen 12. I have heretofore described how the globules of fuel travel in a tangential path from screen 11, and it will be noted that this air and mixture is driven by blades 17 against the tangential path of these globules of fuel leaving screen 11. Again, blades 18 attached to rotor A drive the air and gaseous mixture around the circular space between screen 12 and screen 13, to a certain extent before passing through screen 13, against the tangential path of the globules of the liquid fuel which have left screen 12. Again, fan blades 19, 20, and 21 drive the air and gaseous mixture around the circular space in which they are located against the tangential path of the globules of fuel in their travel from an inner to an outer screen, and thus repeat the vaporization cycle.

It is a well-known fact that a liquid may be vaporized by passing a current of air over it, the vaporization often taking place, when the sensible temperature of both the air and the liquid are materially below the temperature of vaporization of the liquid. However, this system of vaporization is comparatively slow owing to the relative small number of particles of the liquid that are exposed to the action of the air. I, however, have here described a process in which the liquid fuel, in globules, travels at high velocity through air and gaseous mixture, the air and mixture traveling at high velocity in substantially a counter direction, thereby causing the action of the air on a relatively large number of molecules of the liquid fuel, thereby effecting material vaporization of the liquid fuel. The mixture finally passes through screen 16, leaving it in a tangential path, the blades 22 driving that part that is between screen 16 and the casing around to the open space below the rotors, and from this space the mixture travels on through the outlet D, any substance not in gaseous form being caught and deposited in the pan 1.

Although I have shown these fan blades in the preferred embodiment, still they are not absolutely necessary to obtain this vaporization action, and the device may be satisfactorily operated without them. If the blades are omitted, the blade shape of arms 24 of rotor B assists in drawing the air in, and pumping same through the device, and the suction of any internal-combustion engine serves also to induce the flow of air and vapor through the device. The air and mixture in passing through the screens by this action just described is to a certain extent alternately drawn first in one rotative direction, and then in the opposite rotative direction, as it flows through these screens, but the general direction of the air and mixture is principally in radial planes passing through the center line of the rotors. The globules of fuel, therefore, traveling at their very high velocity in a tangential path from each screen consequently cross the general path of the air and mixture, which results in a relative high velocity of the globules of fuel with reference to the air and mixture, thereby causing vaporization to a material extent.

Again, where the fan blades are located outside the screens as heretofore described and shown in Fig. 27, the operation of my device is as follows:—Blades 17 which are now attached to rotor A and rotating with screen 11 drive and wipe the air and mixture between screens 11 and 12 onto the wires of screen 12 before it has passed through this screen, which is rotating in the opposite direction. These wires have impinging on them the globules of the fuel from screen 11, and this strong wiping action on these wires through this broken liquid, effects material vaporization. The action is the same from the other blades in this modified form. I prefer locating the blades, as shown, in the preferred embodiment, but this modified form is particularly effective where it is desired to put a material pressure on the mixture at the outlet passage D.

It is evident from the foregoing that the air and the fuel gas vaporized from the liquid, are both intimately mixed to a most effective manner, thus producing a mixture in which the oxygen of the air is adjacent to the hydrogen and carbon of the fuel, which is ready for quick combustion the instant the mixture is ignited in the cylinder of the internal-combustion engine; when the ratios of air to fuel are correct, the resulting combustion should be complete thus affording very great economy and freedom from the obnoxious exhaust gas.

It is evident that a material quantity of power is required to drive the rotors at high speed while the vaporization processes are taking place, due to imparting high velocity to the globules of fuel, driving the screens against this high velocity of the fuel, and against the resistance of the air and mixture. I therefore have described a device in which a material quantity of power is converted into heat, which is consumed in the vaporization of the liquid, and further the effectiveness of the device varies directly, as the power consumed by the vaporization processes. The word globule as I have herein used it means a small quantity of liquid, and may be of a spherical or an elongated rounding shape, and further may be divided once or many times forming one or many globules.

The commercial liquid fuels vary widely in specific gravity or Baumé gage, temperature of vaporization, latent heat of vaporization, etc. Therefore, the heat necessary for vaporization varies widely. I consequently vary either the number of the screens or the speed of the rotors, or both, to generate the proper quantity of heat for the particular liquid fuel employed. These variations directly affect the power required to drive the rotors, therefore, the power consumed varies also.

It is evident that perforated plates or blades as before described may be used instead of screens, in fact any suitably designed members may be used in place of the circular screens which will accomplish the same functions. The number of fan blades and the relative size of same may be varied to better adapt the device to the particular fuel employed and the internal-combustion engine to which the device may be fitted.

The intake air and also the fuel may be heated by any suitable means from the waste heat of the internal combustion engine to which the device may be fitted. If the air is heated, part of this heat may be used to supply part of the latent heat of vaporization, although the temperature of the air may not be sufficient to raise the temperature of the fuel to the temperature of vaporization. Latent heat thus supplied would directly reduce the heat to be generated in the device and therefore the relative power, speed of rotors, or number of screens.

The electric motor 73, obtaining its current from storage batteries, is particularly adaptable for driving this preferred embodiment, owing to the fact that the rotors may be running when the internal combustion engine to which the device may be fitted is idle, which facilitates the starting of such internal combustion engine, and also affords other obvious advantages in the practical operation.

The preferred embodiment of my invention as shown and described may be employed to generate a very rich mixture by supplying an insufficient quantity of air with reference to the liquid fuel supplied, the remaining necessary air for complete combustion being supplied before combustion takes place in the engine cylinders. Again, my invention may be used for vaporizing the liquid fuel only, by cutting off the air supplied by closing the valve 83 in the passage C, the resulting product of the device being hydrocarbon gas which could be introduced into an internal combustion engine and the air necessary for complete combustion supplied before combustion takes place. Further, my device may be used as a perfecting vaporizer and carbureter by connecting the intake passage C with a carbureter of the ordinary type, which, of itself cannot thoroughly vaporize liquid fuels that do not themselves vaporize readily at ordinary atmospheric temperatures. The products coming from such carbureters usually consist of various quantities of hydrocarbon gas, liquid fuel in suspension, and air in a more or less unmixed condition. It is evident, by cutting off the fuel supply to my device, that this inefficient mixture could be passed through my rapidly revolving rotors, resulting in the complete vaporization of the liquid in suspension and complete mixing of the air and vaporized fuel, thus delivering from my device a thoroughly vaporized and mixed gaseous mixture for combustion.

It is evident that I may put a material pressure on the product of my device passing through the outlet passage D, by means of the fan blades, which is a material advantage in connection with certain types of internal combustion engines.

I have now described the preferred embodiment of my invention and the method of its use for handling liquid fuels of varying density and vaporizing temperatures. This preferred embodiment is particularly adapted to heavy liquid fuels requiring material heat for vaporization, and also for those fuels containing certain dense constituents and foreign matter, which it separates out from the outlet mixture. However, certain liquid fuels would be vaporized and the gas and air thoroughly mixed by the end of the first vaporization cycle heretofore described, in fact, certain liquid fuels vaporizing only slightly above ordinary atmospheric temperature may be effectively vaporized and the gas and air mixed by the use of one rotor only.

I have stated and shown the number of screens, the speed of the rotors and the form and number of fan blades, and the power utilized may be varied or adjusted to suit the particular characteristics of the fuel employed and the engine to which it may be fitted; and the casing would be made suitable to any modified form of the vaporizing members, omitting if not required, the detachable feature and special form of the casing member 1.

This application is a division of my copending application Serial No. 757,501, filed March 29, 1913.

I claim and desire to obtain by Letters Patent the following:

1. The process substantially as herein described of vaporizing liquid fuels not readily vaporized at atmospheric temperatures, which consists of impinging the fuel and resistant surfaces at impacts of high velocity, such impacts being of requisite intensity to generate heat of vaporization of the liquid at the points of impingement, thereby causing vaporization of the liquid due to the heat so generated.

2. The process substantially as herein described of vaporizing liquid fuels not readily vaporized at atmospheric temperatures, which consists of impinging globules of fuel and resistant surfaces at impacts of high velocity, such impacts being of requisite intensity to generate heat of vaporization of the liquid at the points of impingement, thereby causing vaporization of the liquid due to the heat so generated.

3. The process substantially as herein described of vaporizing liquid fuels not readily vaporized at atmospheric temperatures, which consists of successively impinging the fuel and a plurality of resistant surfaces at successive impacts of high velocity, such impacts being of requisite intensity to generate heat of vaporization of the liquid at the points of impingement, thereby causing vaporization of the liquid due to the heat so generated.

4. The process substantially as herein described, of vaporizing liquid fuels not readily vaporized at atmospheric temperature, which consists of impinging globules of fuel and a plurality of resistant surfaces in succession at impacts of high velocity, such impacts being of requisite intensity to generate heat of vaporization of the liquid at the points of impingements, thereby causing vaporization of the liquid due to the heat so generated.

5. The process substantially as herein described of vaporizing liquid fuels not readily vaporized at atmospheric temperatures, which consists in reducing the liquid to a globular condition in suspension in gas, and impinging the globules, and air, gas or mixture, at impacts of high velocity, such impacts being of requisite intensity to produce rapid vaporization through the agitation of the particles of the globules.

6. The process substantially as herein described of vaporizing liquid fuels not readily vaporized at atmospheric temperatures, in the presence of heat from an extraneous source, which consists in reducing the liquid to a globular condition in suspension in gas, and impinging the globules, and air, gas or mixture, at impacts of high velocity, such impacts being of requisite intensity to agitate the particles of the globules to the point of rapid vaporization, thereby causing vaporization of the liquid due to the agitation of the particles of the globules, and to such latent heat of vaporization as is supplied from the extraneous source.

7. The process substantially as herein described of vaporizing liquid fuels not readily vaporized at atmospheric temperatures, which consists in reducing the liquid to a globular condition in suspension in gas, and successively impinging the globules, and air, gas or mixture, at impacts of high velocity, such impacts being of requisite intensity to produce rapid vaporization through the agitation of the particles of the globules.

8. The process substantially as herein described of vaporizing liquid fuels not readily vaporized at atmospheric temperatures, in the presence of heat from an extraneous source, which consists in reducing the liquid to a globular condition in suspension, and successively impinging the globules, and air, gas or mixture, at impacts of high velocity, such impacts being of requisite intensity to agitate the particles of the globules to the point of rapid vaporization, thereby causing vaporization of the liquid due to the agitation of the particles of the globules, and to such latent heat of vaporization as is supplied from the extraneous source.

9. The process substantially as herein described of vaporizing liquid fuels not readily vaporized at atmospheric temperatures, in the presence of heat from an extraneous source, which consists of impinging the fuel and resistant surfaces at impacts of high velocity, such impacts being of requisite intensity to generate heat of vaporization of the liquid at the points of impingement, thereby causing vaporization of the liquid due to the heat so generated and such latent heat of vaporization as is supplied from the extraneous source.

10. The process substantially as herein described of vaporizing liquid fuels not readily vaporized at atmospheric temperatures, in the presence of heat from an extraneous source, which consists of successively impinging the fuel and a plurality of resistant surfaces at impacts of high velocity, such impacts being of requisite intensity to generate heat of vaporization of the liquid at the points of impingement, thereby causing vaporization of the liquid due to the heat so generated and to such latent heat of vaporization as is supplied from the extraneous source.

11. The process substantially as herein described of vaporizing liquid fuels not readily vaporized at atmospheric temperatures, which consists of impinging the fuel and resistant surfaces at impacts of high velocity, such impacts being of requisite intensity to generate heat of vaporization at the points or impingement, and impinging globules of the liquid, and air, gas or mixture, at impacts of high velocity, such impacts also being of requisite intensity to agitate the particles of the globules to the point of rapid vaporization, thereby causing vaporization of the liquid due both to the heat generated and to the agitation of the particles of the globules.

12. The process substantially as herein described of vaporizing a liquid fuel not readily vaporized at atmospheric temperatures, in the presence of heat from an extraneous source, which consists of impinging the fuel and resistant surfaces at impacts of high velocity, such impacts being of requisite intensity to generate heat of vaporization of the liquid at the points of impingement, and impinging globules of the liquid, and air, gas or mixture, at impacts of high velocity, such impacts also being of requisite intensity to agitate the particles of the globules to the point of rapid vaporization, thereby causing vaporization of the liquid due to the heat generated, to the agitation of the particles of the globules, and to such latent heat of vaporization as is supplied from the extraneous source.

13. The process substantially as herein described of vaporizing liquid fuels not readily vaporized at atmospheric temperatures, which consists of successively impinging the fuel and a plurality of resistant surfaces at impacts of high velocity, such impacts being of requisite intensity to generate heat of vaporization at the points of impingement, and successively impinging globules of the liquid, and air, gas or mixture, at impacts of high velocity, such impacts also being of requisite intensity to agitate the particles of the globules to the point of rapid vaporization, thereby causing vaporization of the liquid due both to the heat generated and to the agitation of the particles of the globules.

14. The process substantially as herein described of vaporizing a liquid fuel not readily vaporized at atmospheric temperatures, in the presence of heat from an extraneous source, which consists of successively impinging the fuel and a plurality of resistant surfaces at impacts of high velocity, such impacts being of requisite intensity to generate heat of vaporization of the liquid at the points of impingement, and successively impinging globules of the liquid, and air, gas or mixture, at impacts of high velocity, such impacts also being of requisite intensity to agitate the particles of the globules to the point of rapid vaporization, thereby causing vaporization of the liquid due to the heat generated, to the agitation of the particles of the globules, and to such latent heat of vaporization as is supplied from the extraneous source.

In testimony whereof I have signed this specification in the presence of two subscribing witnesses.

HENRY NEWTON WHITTELSEY.

Witnesses:
  A. D. WEEKES, Jr.,
  M. M. RIEMANN.